(12) United States Patent
Lin et al.

(10) Patent No.: US 7,455,294 B2
(45) Date of Patent: Nov. 25, 2008

(54) PAPER-RELEASING MECHANISM

(75) Inventors: Chih-Ming Lin, Hsinchu (TW);
Chih-Yang Chen, Hsinchu (TW);
Huan-Hsing Hsiao, Hsinchu (TW)

(73) Assignee: Foxlink Image Technology Co., Ltd., Hsinchu (TW)

( * ) Notice: Subject to any disclaimer, the term of this patent is extended or adjusted under 35 U.S.C. 154(b) by 407 days.

(21) Appl. No.: 11/301,594

(22) Filed: Dec. 13, 2005

(65) Prior Publication Data
US 2007/0132173 A1  Jun. 14, 2007

(51) Int. Cl.
*B65H 5/00* (2006.01)
*G03G 15/16* (2006.01)
*G03G 21/00* (2006.01)

(52) U.S. Cl. .................. 271/264; 399/122; 399/124

(58) Field of Classification Search .............. 399/124, 399/17, 21, 367, 23, 392, 391, 393; 271/3.01, 271/3.05, 3.08, 264, 273, 4.01, 256, 3.14
See application file for complete search history.

(56) References Cited

U.S. PATENT DOCUMENTS

| | | | | |
|---|---|---|---|---|
| 4,972,206 A | * | 11/1990 | Matoushek | 347/212 |
| 5,545,882 A | * | 8/1996 | Tanaka | 235/98 R |
| 6,145,779 A | * | 11/2000 | Johnson et al. | 242/560.1 |
| 6,336,629 B1 | * | 1/2002 | Carter et al. | 271/274 |
| 6,341,777 B1 | * | 1/2002 | Carter | 271/291 |
| 7,333,767 B2 | * | 2/2008 | Kaneko et al. | 399/407 |
| 2004/0018034 A1 | * | 1/2004 | Baek et al. | 399/405 |
| 2004/0114979 A1 | * | 6/2004 | Nanno | 399/392 |
| 2004/0135310 A1 | * | 7/2004 | Yang | 271/226 |
| 2005/0110206 A1 | * | 5/2005 | Hsieh | 271/117 |
| 2006/0239715 A1 | * | 10/2006 | Lee et al. | 399/122 |
| 2007/0031165 A1 | * | 2/2007 | Lee et al. | 399/124 |

FOREIGN PATENT DOCUMENTS

| | | | |
|---|---|---|---|
| JP | 03192075 | * | 8/1991 |
| JP | 2001130780 | * | 5/2001 |

* cited by examiner

*Primary Examiner*—Patrick H Mackey
*Assistant Examiner*—Patrick D Cicchino

(57) ABSTRACT

A paper-releasing mechanism includes a paper-feeding device for feeding papers, a supporting shelf arranged under the paper-feeding device, a driving roller and an idle roller arranged in the front of the paper-feeding device and an elastic unit engaged with the idle roller and the supporting shelf. The elastic unit includes a connecting arm, act arms bending from the ends of the connecting arm respectively, two helixes each of which extends from the act arm and forms an aperture and two follow act arm each of which extends from the helix and forms a ring at the end thereof, the ring being sleeved on the rolling pivot of the idle roller, the apertures being sleeved on a pivot formed on the supporting shelf.

4 Claims, 11 Drawing Sheets

PAPER-RELEASING MECHANISM

BACKGROUND OF THE INVENTION

1. Field of the Invention

The present invention relates to a paper-releasing mechanism, and more particularly to a paper-releasing mechanism including an elastic unit for releasing an idle roller to draw out a paper easily when the paper is jammed.

2. The Related Art

Business machines, such as a scanner, a printer, a copier, etc., are broadly required in an office. The business machine has a paper-supplying tray to feed papers into the business machine. Sometimes, the paper is jammed and hard to draw out.

For example, a printer comprises a pick-up device, a paper-feeding device, a draw-out device and a printing device. The pick-up device is provided for picking up papers stacked in a paper-supplying tray and then the paper enters a paper-feeding path, the paper-feeding device feeds the paper to the printing device. After the paper is printed, the draw-out device draws out the printed paper from the printer one by one.

In the printer, the paper-feeding device includes a plurality of pairs of rollers arranged in the paper-feeding path. Each pair of rollers includes a driving roller and an idle roller. The pair of rollers, which is located at the back end of the paper-feeding path, is covered by a rotatable housing.

When printing, the paper stacked in a paper-supplying tray enters into the paper-feeding path one by one via the pick-up device. The driving roller is driven by a motor (not shown) and drives the paper to pass through the paper-feeding path. The idle roller is driven by the driving roller. As a result, the paper is fed between the driving roller and the idle roller. Next, the paper is printed by the printing device. Finally, the paper is drawn out from the printer by the draw-out device.

Unavoidably, when printing, the paper is sometimes jammed, and more particularly is jammed between the drive roller and the idle roller at the back end of the paper-feeding path. Then, the rotatable housing has to be lifted up in order to draw out the paper jammed between the drive roller and the idle roller.

However, the driving roller and the idle roller match up closely. When the paper is drawn out, the friction against the paper and the rollers is great. Therefore, it is hard to draw out the paper. In other words, it causes inconvenience for the user. Moreover, the paper is easy to be torn and the engagement between the driving roller and the idle roller is easy to be loosened.

SUMMARY OF THE INVENTION

An object of the present invention is to provide a paper-releasing mechanism, which comprises a paper-feeding device, a supporting shelf, a driving roller and an idle roller provided for feeding papers, an elastic unit engaging with the idle roller and a housing covering the paper-feeding device and contacting with the elastic unit. With the housing closed, the elastic unit creates elastic force to the idle roller. When a paper is jammed between the driving roller and the idle roller, the housing is opened and the elastic force created by the elastic unit is released. Therefore, the jammed paper is easily to be drawn out.

BRIEF DESCRIPTION OF THE DRAWINGS

The present invention is further described in the detailed description below, with reference to the noted plurality of drawings by way of non-limiting examples of exemplary embodiments of the present invention, in which like reference numerals throughout several views of the drawings, and wherein.

DETAILED DESCRIPTION OF PREFERRED EMBODIMENT

Figure 1:
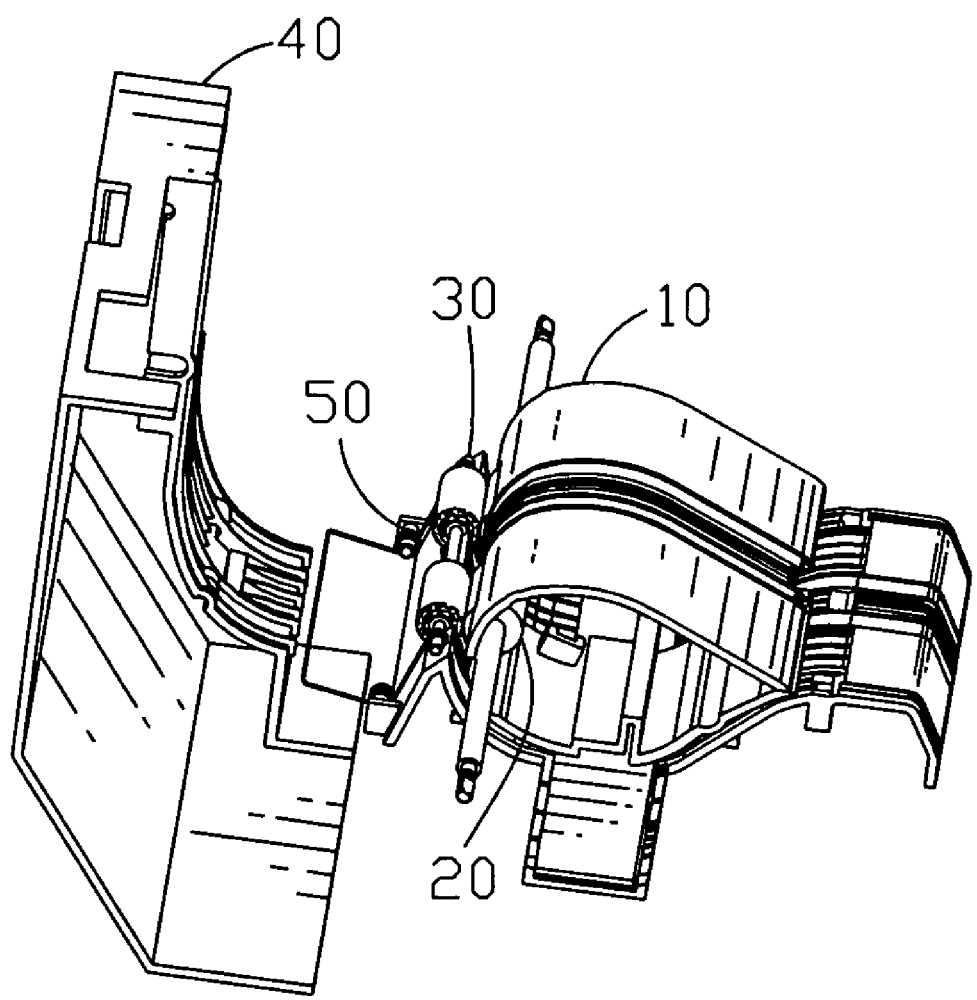
FIG. 1 is a perspective view of a first embodiment of a paper-releasing mechanism of the present invention.

Please refer to FIG. 1, a first embodiment of a paper-releasing mechanism 100 of the present invention comprises a paper-feeding device 10, a driving roller 20 and an idle roller 30 arranged in the front of the paper-feeding device 10, a housing 40 covers the paper-feeding device 10 and is rotatable. An elastic unit 50, such as a spring unit is mounted on the idle roller 30 and cooperates with the housing 40.

Figure 2:
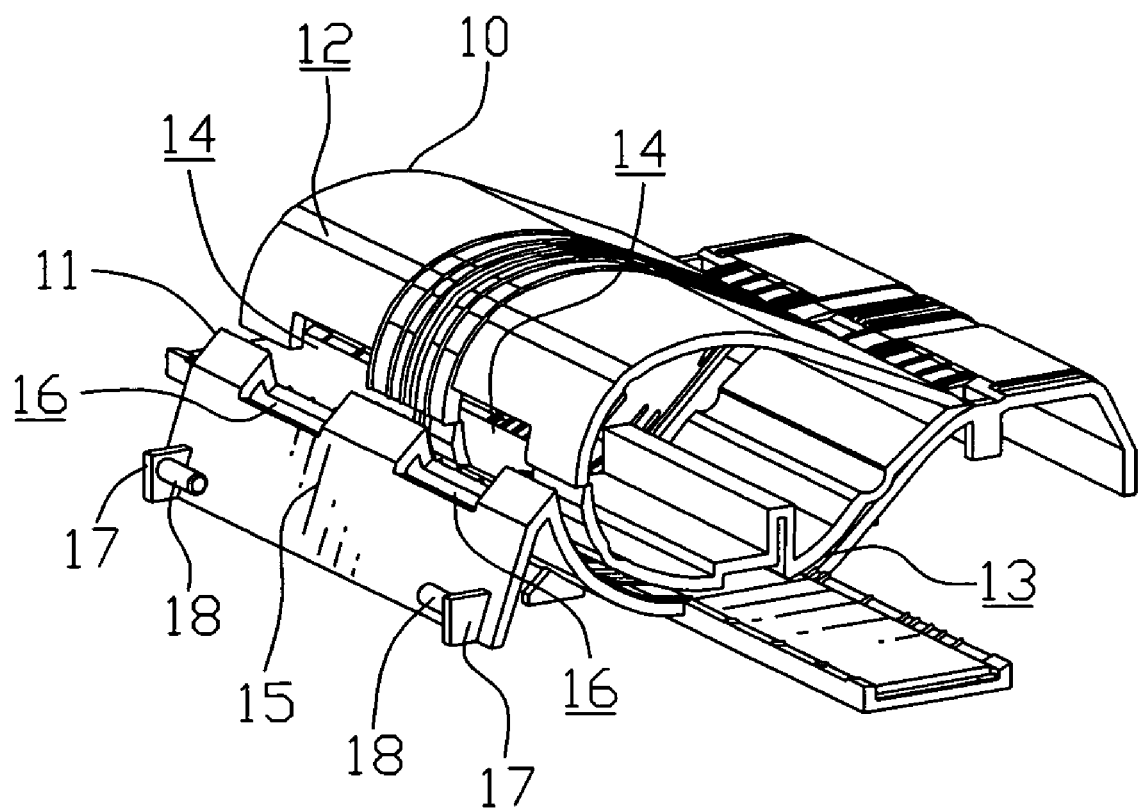
FIG. 2 is a perspective view of a paper-feeding device of the paper-releasing mechanism shown in FIG. 1.

As show in FIG. 2, the paper-feeding device 10 is ring-shaped and forms a paper-feeding path, the paper-feeding path has a paper-entering path 12 and a paper-exiting path 13. The paper-entering path 12 is formed on top surface of the paper-feeding device 10 and the paper-exiting path 13 is formed on bottom surface of the paper-feeding device 10. Two openings 14 are formed in the front end of the paper-feeding device 10. A supporting shelf 11 is arranged to cooperate with the two openings 14. A block board 15 is formed at the extended end of the supporting shelf 11. A pair of block blades 17 are formed at the end of the block board 15 and each of the block blades 17 has a cylindrically shaped pivot 18 formed on the inner side thereof. There are two recesses 16 formed on the supporting shelf 11 to match up with the two openings 14.

Figure 3:
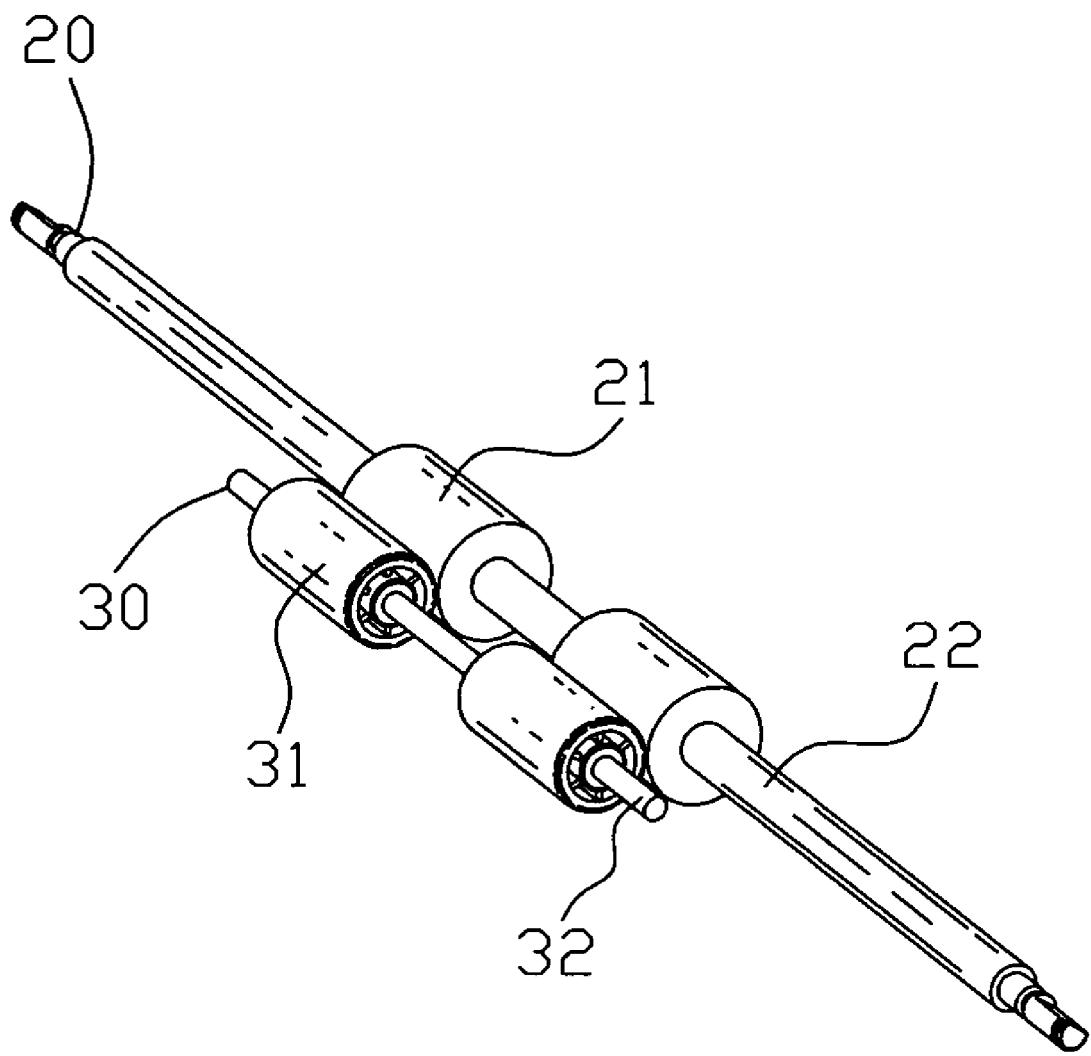
FIG. 3 is a perspective view of a driving roller and an idle roller of the paper-releasing mechanism.

As shown in FIG. 3, each of the driving roller 20 and the idle roller has a rolling pivot 22, 32 and at least a roller 21, 31 sleeved on the rolling pivot 22, 32, respectively.

Figure 4:
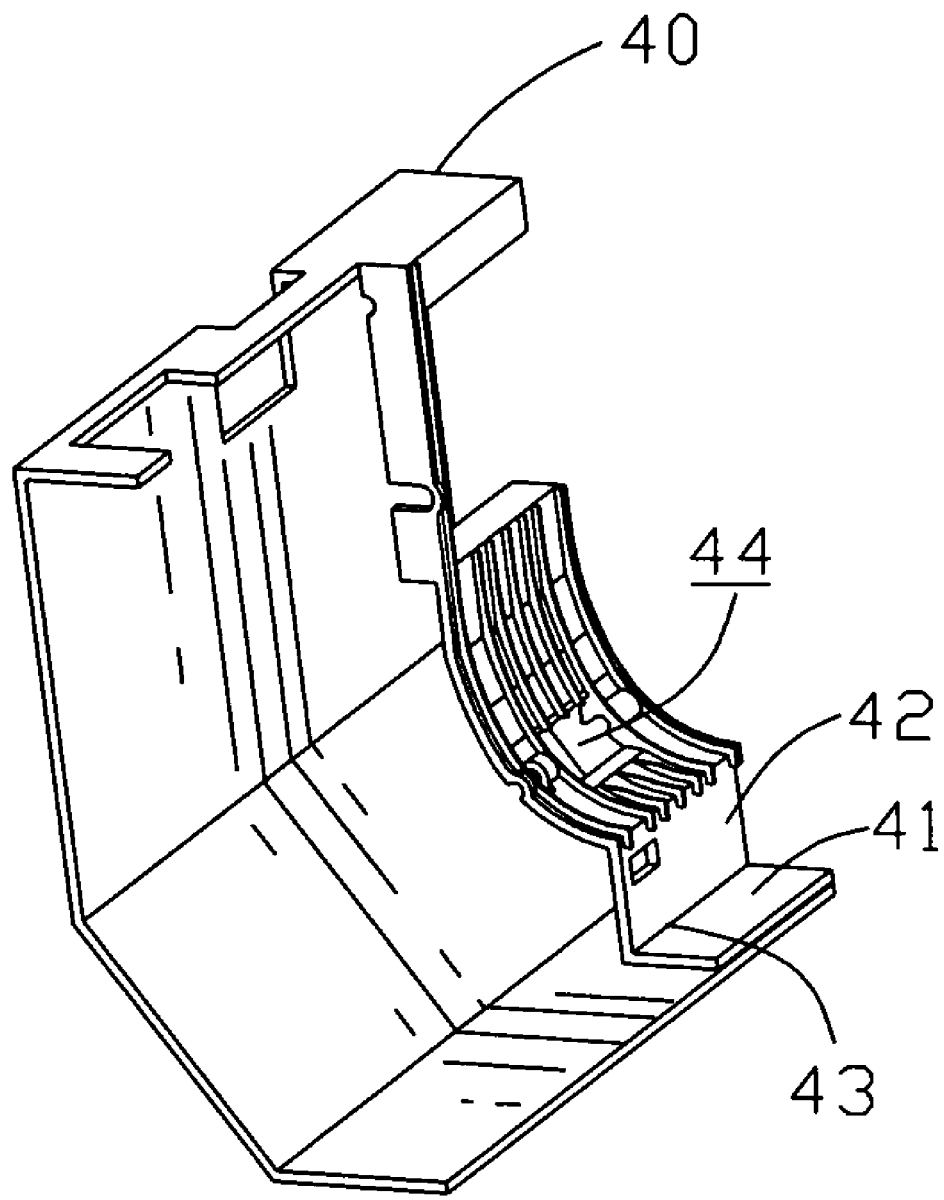
FIG. 4 is a perspective view of a housing of the paper-releasing mechanism.

FIG. 4 is a perspective view of the housing 40 for covering the paper-feeding device 10. The housing 40 has a horizontal surface 41, a vertical surface 42 perpendicular to the horizontal surface 41 and a space 43 formed by the horizontal surface 41 and the vertical surface 42.

Figure 5:
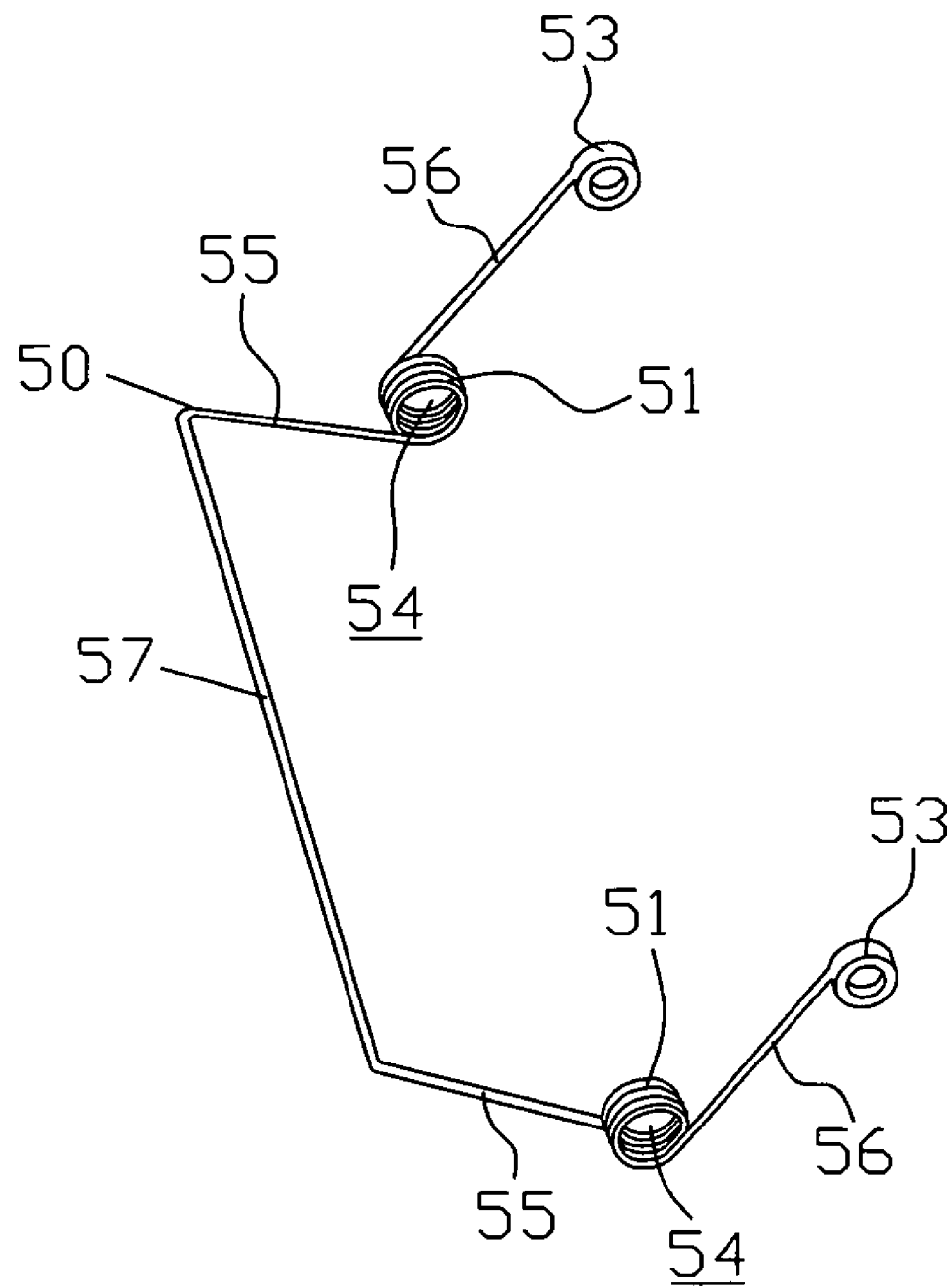
FIG. 5 is a perspective view of an elastic unit of the paper-releasing mechanism.

FIG. 5 shows an elastic unit 50. The elastic unit 50 comprises a connecting arm 57, two act arms 55 bending from two ends of the connecting arm 57 respectively, two helixes 51 each of which extends from the connecting arm 57 and forms an aperture 54 and two follow act arm 56 each of which extends from the helix 51 and forms a ring 53 at the end thereof. The act arm 55 and the follow act arm 56 form an obtuse angle when they are in a normal position. The two rings 53 are provided for being sleeved on the two ends of the rolling pivot 32. The aperture 54 is sleeved on the pivot 18 of each block blade 17.

Figure 6:
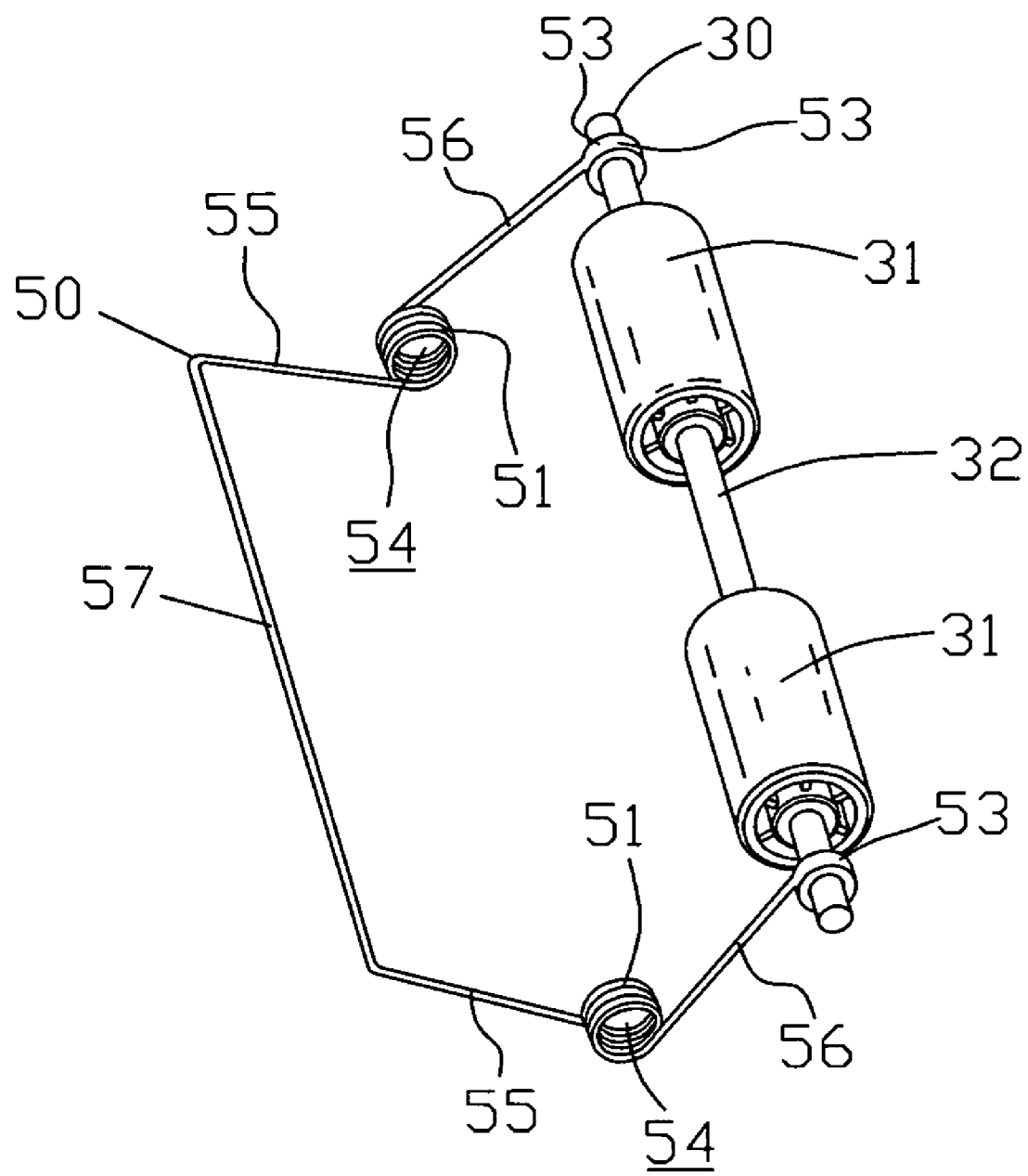
FIG. 6 is a perspective view of the elastic unit shown in FIG. 5 with two rings sleeved on the idle roller.
Figure 7:
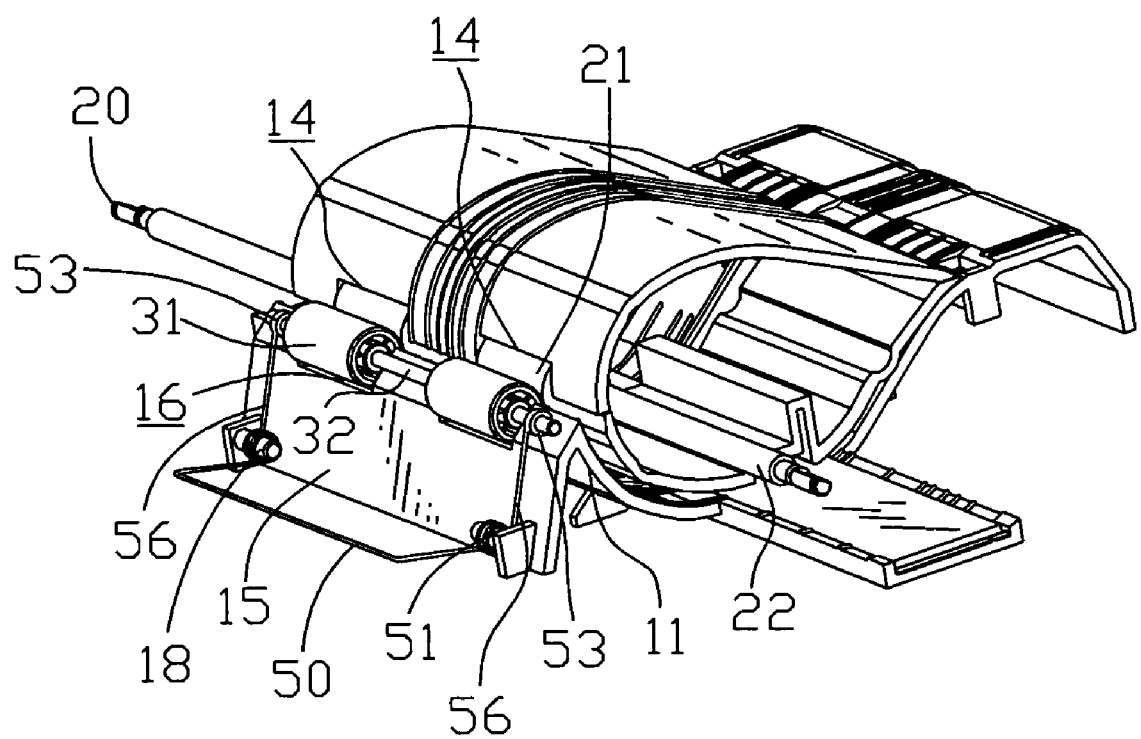
FIG. 7 is a perspective view of the paper-feeding device assembled with the elastic unit.

The first embodiment of the paper-releasing mechanism 100 is described. Please refer to FIGS. 6 and 7. Firstly, the idle roller 30 is sleeved by the two rings 53 of the two follow act arms 56. The two rollers 21 of the driving roller 20 are disposed in the two openings 14 of the paper-feeding device 10. Meanwhile, the two apertures 54 of the elastic unit 50 are respectively sleeved on the two pivots 18. The two follow act arms 56 of the elastic unit 50 press the block board 15. The two rollers 31 are respectively disposed in the two recesses 16 of the supporting shelf 11.

Figure 8:
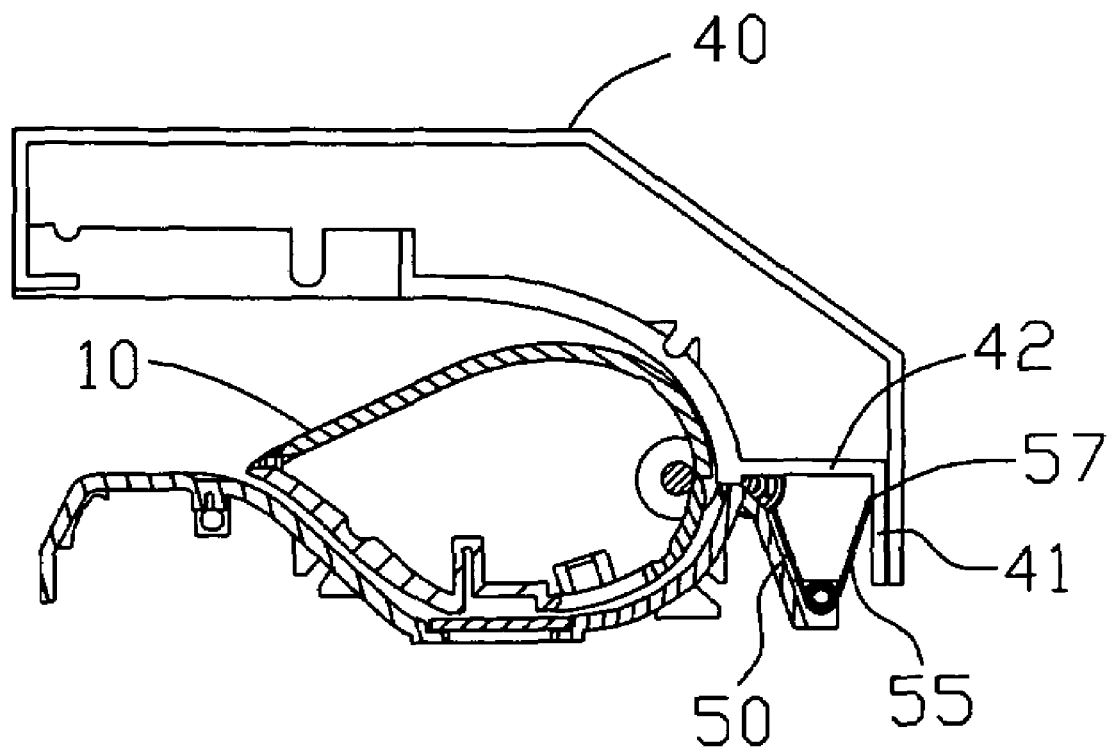
FIG. 8 is a sectional view of the first embodiment of the paper-releasing mechanism when the housing is in a closed position.

As shown in FIG. 8, the connecting arm 57 of the elastic unit 50 contacts with the horizontal surface 41 of the housing 40. When the housing 40 rotates downward and covers the paper-feeding device 10, the end of the horizontal surface 41 is provided to be a supporting position. The horizontal surface 41 always presses the connecting arm 57 closely. As a result, the act arm 55 is obliged to move towards the follow act arm. The angle which is formed between the act arm 55 and the follow act arm 56 is getting smaller. Therefore, the elastic unit 50 creates enough elastic force to allow the rollers 31 of the idle roller 30 pressing the rollers 21 of the driving roller 20 closely.

Then, please refer to FIGS. 1-2, when a piece of paper stacked in the paper-supplying tray (not shown) is ready to be printed, the paper is fed through the paper-entering path 12 by the paper-feeding device 10 and passes through the driving roller 20 and the idle roller 30. The driving roller 20 and the idle roller 30 are rolling towards each other and pull out the paper.

Figure 9:
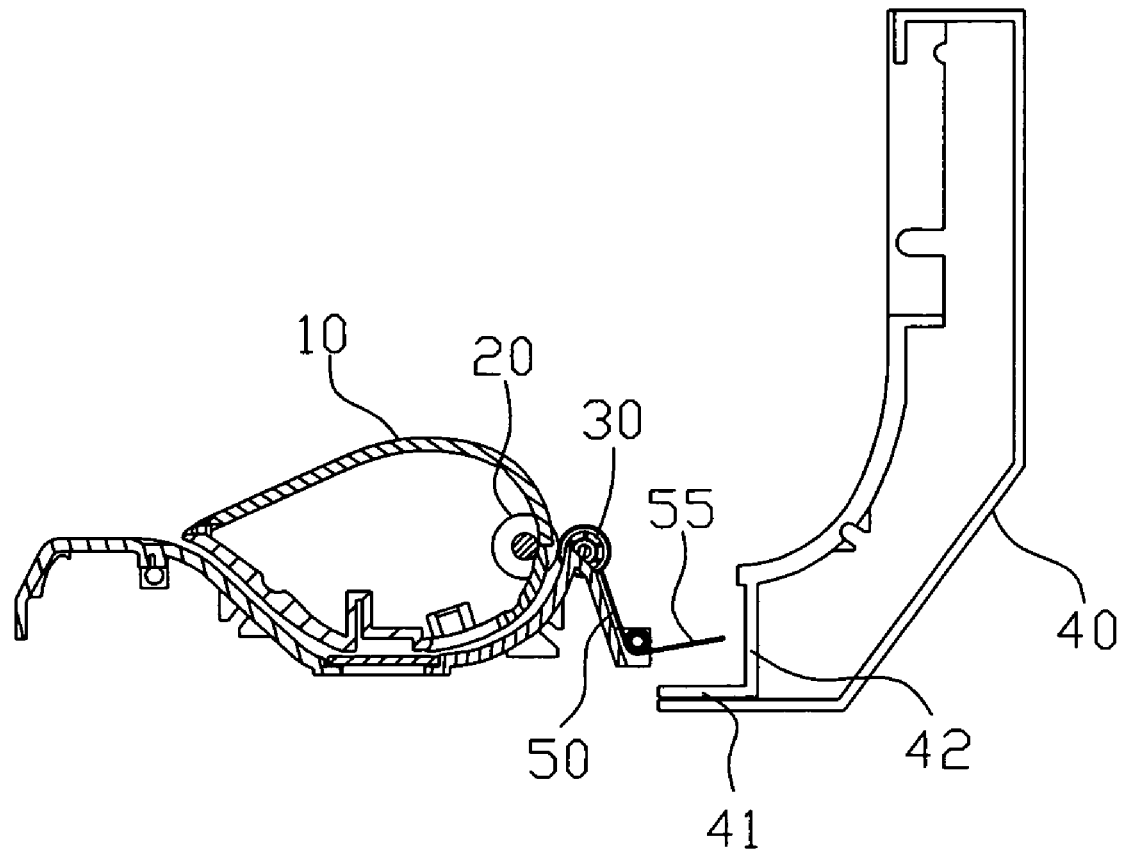
FIG. 9 is a sectional view showing the first embodiment of the paper-releasing mechanism when the housing is in an open position.

Unavoidably, when printing, the paper is sometimes jammed between the driving roller 20 and the idle roller 30. As shown in FIG. 9, according to the first embodiment of the present invention, when the paper is jammed between the driving roller 20 and the idle roller 30, a user lifts up the housing 40, the housing 40 rotates around the end of the horizontal surface 41. The horizontal surface 41 is provided to be a supporting position. Originally, the two act arms 55 of the elastic unit 50 are located in the space 43 and still elastically press the housing 40 to help the rotating of the housing 40. Then, the housing 40 rotates and departs from the spring apparatus 50 to an open position. The elastic force of the elastic unit 50 is released. As a result, the driving roller 20 and the idle roller 30 recover to the normal position. The friction between the driving roller 20 and the idle roller 30 decreases, the paper jammed between the driving roller 20 and the idle roller 30 is easy to be drawn out.

Figure 10:
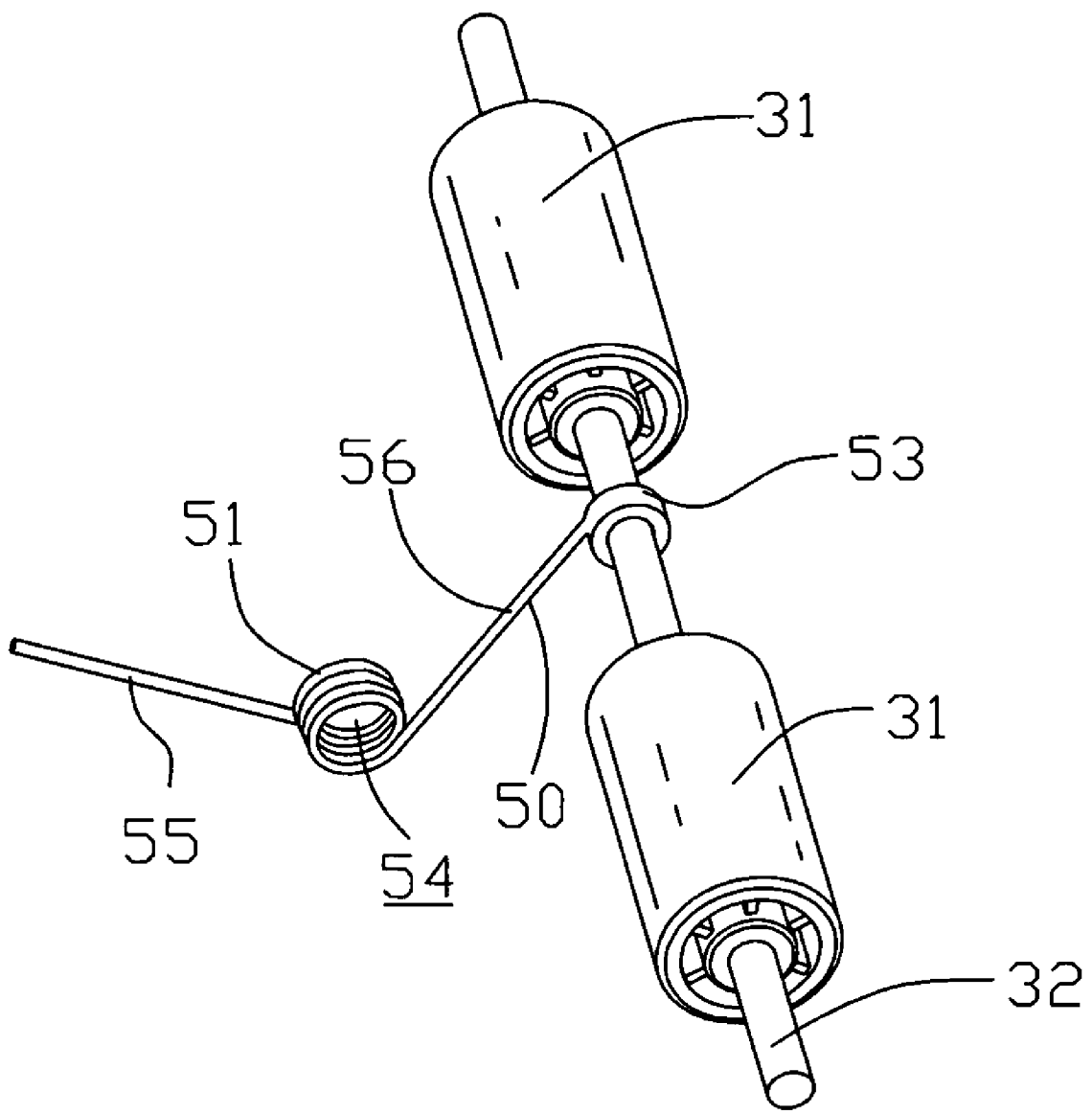
FIG. 10 is a perspective view showing a second embodiment of the elastic unit of the present invention.
Figure 11:
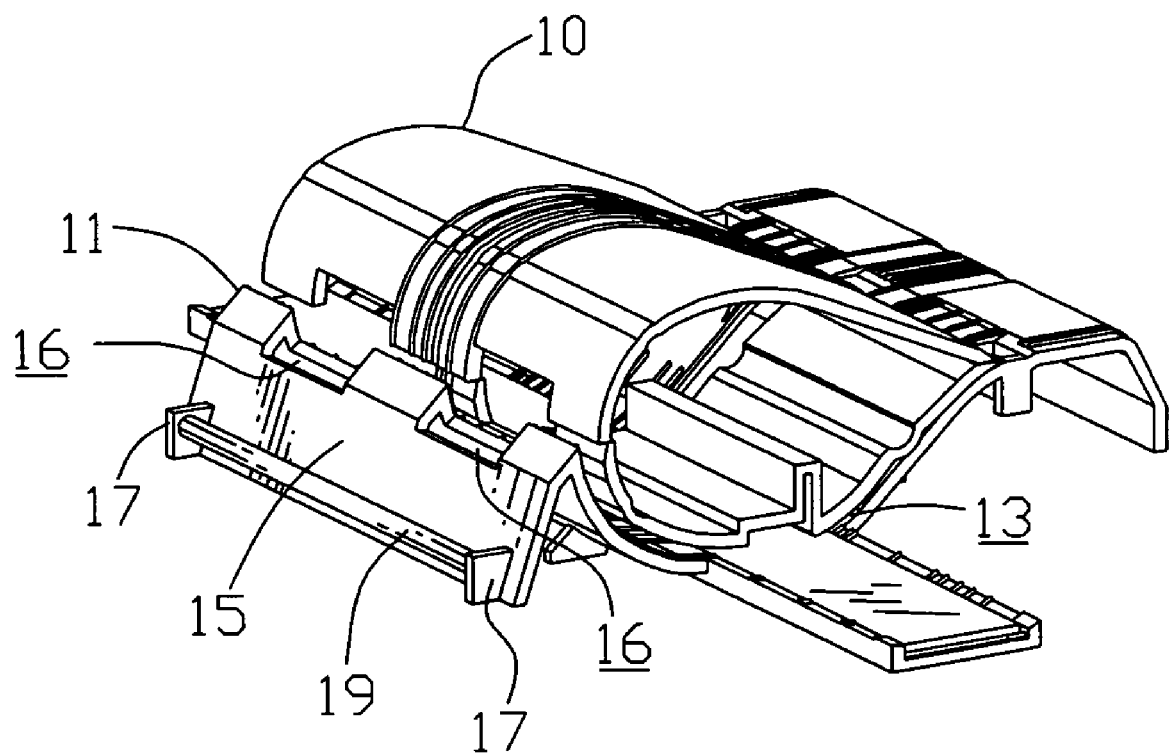
FIG. 11 is a perspective view showing a paper-feeding device of the second embodiment of the paper-releasing mechanism of the present invention.

Please refer to FIG. 10, a second embodiment of the paper-releasing mechanism 100 is shown. The elastic unit 50 of the paper-releasing mechanism 100 comprises an act arm 55, a helix 51 extending from the act arm 55 and forming an aperture 54 and a follow act arm 56 extending from the helix 51 and forming a ring 53 at end thereof. The act arm 55 and the follow act arm 56 form an obtuse angle in normal position. The ring 53 is substantially sleeved on the middle of the rolling pivot 32 and located between the two rollers 31. There is a cylindrically shaped arm 19 engaged between the block blades 17. The aperture 54 of the helix 51 is sleeved on the cylindrically shaped arm 19, as can be seen in FIG. 11.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A paper-releasing mechanism, comprising:
a paper-feeding device forming a paper-feeding path, the paper-feeding path feeding papers stacked in a paper supplying tray, at least one opening being formed at a front end of the paper-feeding path;
a supporting shelf arranged under the paper-feeding path and provided with at least one recess;
a driving roller arranged in a front end of the paper-feeding device, the driving roller having a rolling pivot and at least one roller sleeved on the pivot and disposed in an opening of the paper-feeding device;
an idle roller having a rolling pivot and at least one roller sleeved on the pivot and disposed in two recesses of the supporting shelf, the roller of the idle roller cooperating with the roller of the driving roller; and
an elastic unit including a connecting arm, act arms bending from two ends of the connecting arm respectively, two helixes each of which extends from the connecting arm and forms an aperture and two follow act arms each of which extends from the helix and forms a ring at an end thereof, the ring being sleeved on the rolling pivot of the idle roller, the apertures being sleeved on a pivot formed on the supporting shelf;
wherein one end of the supporting shelf is connected to a bottom end of the paper-feeding device, the other end of the supporting shelf extends downward and forms a block board, a pair of block blades are formed at an end of the block board and each block blade has a pivot on an inner side of the block blade.

2. The paper-releasing mechanism as set forth in claim 1, further comprising a housing, the housing contacting with the connecting arm of the elastic unit so that the elastic unit creates an elastic force to the idle roller and the driving roller to press the idle roller and the driving roller closely when the housing rotates towards the paper-feeding device device.

3. The paper-releasing mechanism as set forth in claim 1, wherein the paper-feeding path has a paper-entering path formed on a top surface of the paper-feeding device and a paper-exiting path formed on a bottom surface of the paper-feeding device.

4. The paper-releasing mechanism as set forth in claim 1, wherein the aperture is sleeved on an arm engaged between the block blades of the supporting shelf.

* * * * *